April 12, 1949.  J. EVANS  2,467,120
HEAT DETECTING SYSTEM
Filed April 25, 1945  3 Sheets-Sheet 1
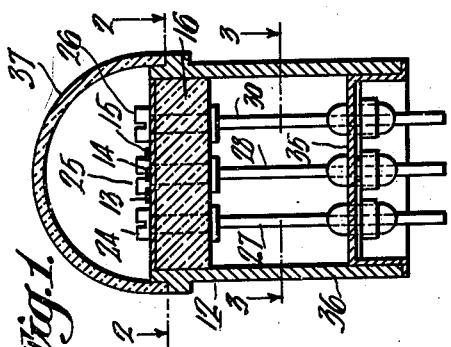
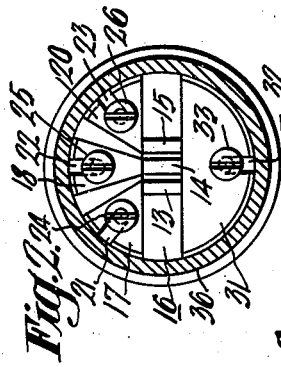
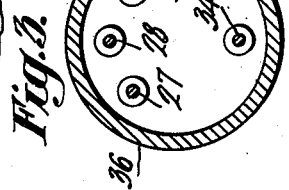
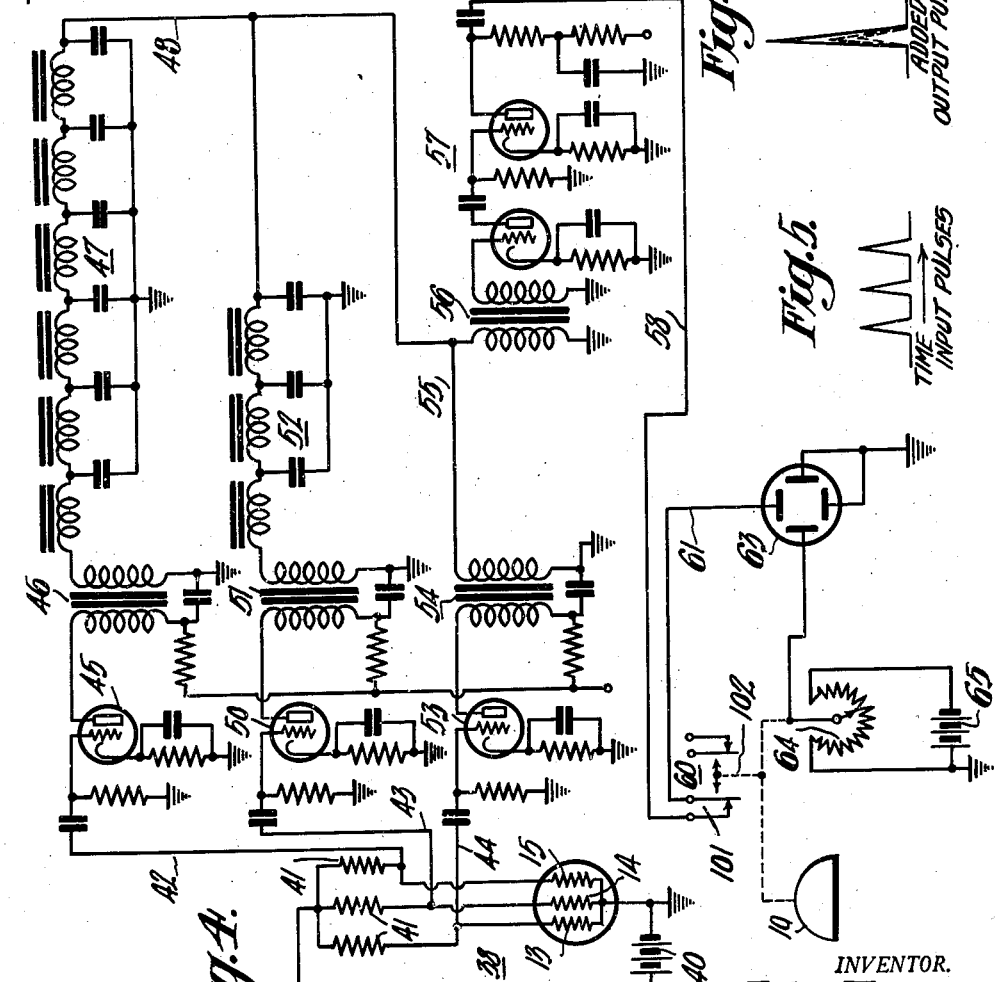
INVENTOR.
John Evans
BY
ATTORNEY April 12, 1949. J. EVANS 2,467,120
HEAT DETECTING SYSTEM
Filed April 25, 1945 3 Sheets-Sheet 2
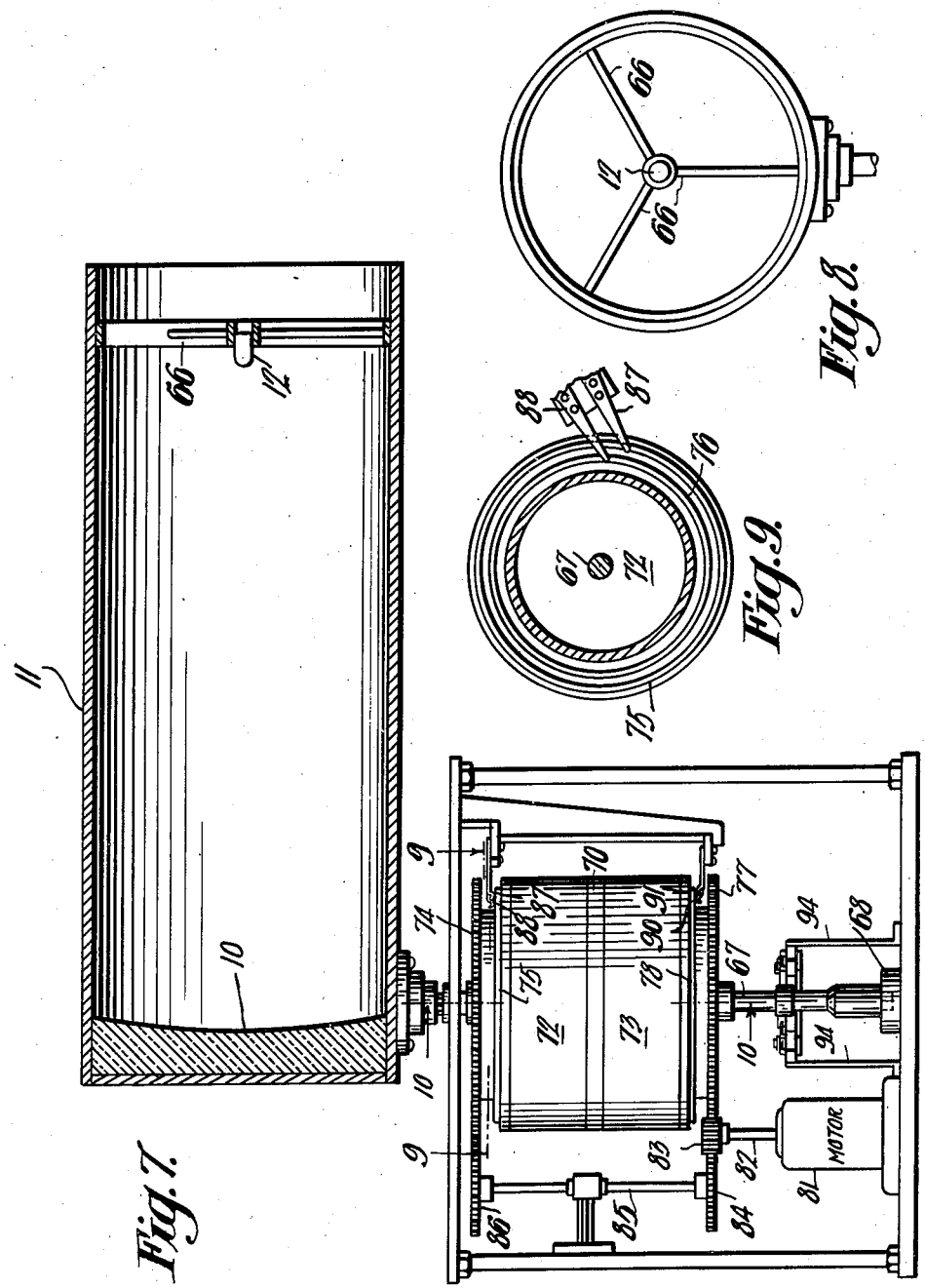
INVENTOR.
John Evans
BY
C. D. Tuska
ATTORNEY

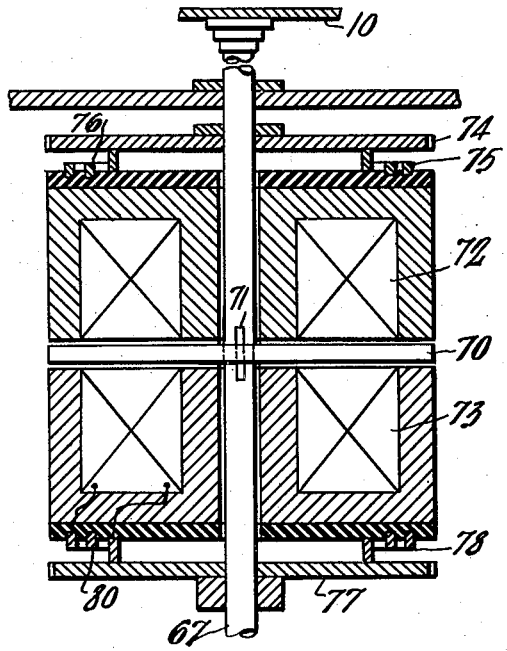
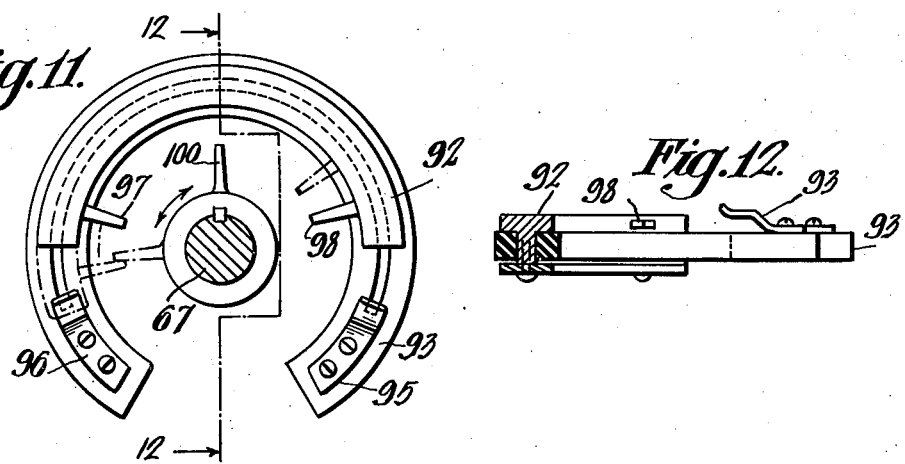
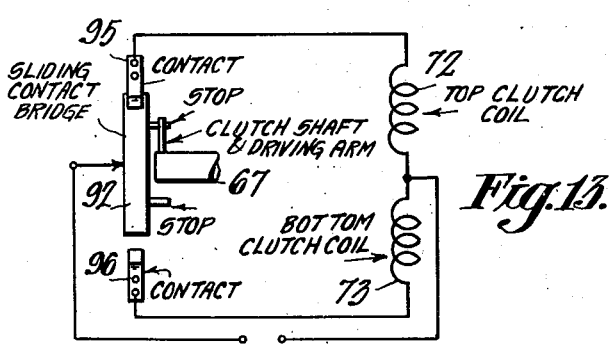

Patented Apr. 12, 1949

2,467,120

UNITED STATES PATENT OFFICE 2,467,120

HEAT DETECTING SYSTEM

John Evans, Hightstown, N. J., assignor to Radio Corporation of America, a corporation of Delaware Application April 25, 1945, Serial No. 590,293

10 Claims. (Cl. 250—83.3)

The present invention relates to infra red detectors and more particularly to a system having an improved ratio of signal to noise.

In the detection of infra red heat waves by means of heat sensitive elements it has been found that random noises so impair the reception as to render a large percentage of received signals either unintelligible or undetectable.

An object of the present invention is to provide an improved system for detecting heat waves.

Another object of the invention is to provide a system wherein signals heretofore undetectable because of noise are now detectable.

Another object of the invention is to provide a system wherein a signal is successively detected by a plurality of sensitive heat responsive elements and translated to a receiving device as a composite signal giving a magnification of the signal detected by a single heat responsive element.

A further object of the invention is to provide a scanning device for sweeping the horizon to locate a source of heat arranged in association with a unit responsive to heat waves to generate a plurality of electrical pulses in timed sequence as a function of the sweep of the scanning device, and superposing the pulses to form an output greater in amplitude than any one of the pulses.

Other objects will appear hereinafter.

In the accompanying drawings, Figure 1 represents a side elevation of one form of heat detecting unit of the invention; Figure 2 represents a section on line 2—2 of Fig. 1; Figure 3 represents a section on line 3—3 of Fig. 1; Figure 4 is a diagram of one form of circuit of the present invention; Figure 5 is a graph of the time input pulses, taken as an illustration; Figure 6 is a graph of the added output pulses as derived by the operation of the invention; Figure 7 represents a side elevation, in part section, of one form of scanning mechanism employed in association with the system of the present invention; Figure 8 represents an end elevation of the heat detecting unit; Figure 9 represents a section on line 9—9 of Fig. 7; Figure 10 represents a section on line 10—10 of Fig. 7; Figure 11 represents a detail in end elevation of the clutch control switch; Figure 12 represents a section on line 12—12 of Fig. 11; Figure 13 is a circuit diagram of the clutch control.

Referring to the drawings, one form of the invention comprises a parabolic mirror 10 suitably mounted within a drum 11 which is rotatable about a vertical axis in order that the effective field of the mirror 10 can be made to sweep the horizon at a uniform rate. When the mirror 10 intercepts incoming infra red rays, the latter are reflected to a heat detecting unit 12 mounted at the focus of the mirror 10. This unit 12 comprises three thermal elements 13, 14 and 15 mounted in spaced apart relation but in close proximity within a head 16, in the form of an insulated ring which is the base or support of a microfilm. The thermal elements 13, 14 and 15 are resistors formed of material having a negative coefficient of temperature when exposed to heat. For example, these resistors are preferably tellurium oxide. The film includes three contacts 17, 18 and 20 insulated one from the other and preferably of gold, and respectively conductively connected to the elements 13, 14 and 15. The periphery of the ring is interrupted by slots 21, 22 and 23 respectively formel in the contacts 17, 18 and 20, to receive mounting screws 24, 25 and 26 traversing the head 16 and respectively conductively connected to terminal pins 27, 28 and 30. A fourth contact 31 is conductively connected to the thermal elements 13, 14 and 15 as a common return for the several electric circuits, and has a peripheral slot 32 to receive a mounting screw 33 leading to the return terminal pin 34. The extended terminals 27, 28, 30 and 34 are supported in insulated relation by a plate 35 forming an end closure for a cylindrical casing 36 which houses the foregoing parts with the head 16 closing the opposite end thereof. A heat transparent window 37 formed as a segment of a sphere seals the exposed element end of the contact head, and is preferably formed of silver chloride and serves to direct the received heat rays to the sensitive elements. Preferably the exposed face of each of these elements has a coating of heat absorbing material, having a negative coefficient of resistance, such for example as a black conductive oxide.

In order to produce an electrical signal as each element 13, 14 and 15 responds to the detected heat, these elements are connected in parallel in a circuit 38 including a source of voltage 40 and suitable resistances 41 respectively in series with the aforesaid elements. Thus, as the axis of the mirror 10 sweeps across a source of heat, the detecting elements 13, 14 and 15 will successively respond to generate a signal or pulse to be transmitted by way of conductor 42 first, conductor 43 second, and conductor 44 third. For illustration, the second pulse from a conductor 43 may follow the first pulse by one-thirtieth of a second, and the third pulse from the conductor 44 may follow the second pulse also by one-thirtieth of a second, or two-thirtieths of a second after the first pulse.

Since the three pulses are out of phase as to time and it is desirous of obtaining an output of the pulses in phase as to time, the signal or pulse transmitted by the conductor 42 is initially amplified by a single stage amplifier 45 having an output to the primary of a transformer 46. The secondary of the transformer 46 becomes the input to a time delay network 47, wherein, in the present illustration, the travel of the generated pulse is delayed two-thirtieths of a second before reaching the output conductor 48. Similarly, the pulse transmitted by the conductor 43 is initially amplified by a single stage amplifier 50 having an output to the primary of a transformer 51. The secondary of the transformer 51 becomes the input to a time delay network 52, wherein, in the present illustration, the travel of the generated pulse is delayed one-thirtieth of a second before reaching the output conductor 48. Also, the pulse transmitted by the conductor 44 is initially amplified by a single stage amplifier 53 having an output to the primary of a transformer 54. The secondary of the transformer 54 is directly connected by a conductor 55 to the output conductor 48 so that the time or phase of the pulse is unchanged. The conductor 48 being common to the three circuits carries the three pulses to the primary of a transformer 56, the secondary of which delivers the combined or superposed pulses to a two stage amplifier 57 from which the added output leads by the conductor 58 to a control switch 60 and thence by a conductor 61 to the vertical deflector plates of an electron ray tube 63 of the visual type. The necessary deflecting voltage for the horizontal plates of the tube 63, as a time factor, is derived from a potentiometer 64 included in a circuit having a source of voltage 65. The potentiometer 64 is mechanically connected to follow the scanning movement of the mirror 10 as a control for the deflecting voltage for the horizontal angle indication as will be hereinafter explained.

As here shown, the scanning drum 11 is of elongated cylindrical shape having the heat detecting unit mounted coaxially by a spider 66 in position to locate the heat cells at the focus of the mirror 10 which is mounted at or near the opposite end of the drum 11. Scanning motion is transmitted to the drum 11 by a vertically disposed shaft 67 mounted in a step bearing 68 and arranged to be oscillated by an armature clutch disc 70 keyed to the shaft by a key 71 for limited linear motion. As shown, the disc 70 is positioned between two annular solenoids 72 and 73 encircling the shaft 67, the former, 72, having a driven gear 74 attached thereto, as well as two spaced apart contactor rings 75 and 76, while the latter, 73, has a driven gear 77 attached thereto, as well as two spaced apart contactor rings 78 and 80. Thus, depending upon which solenoid is energized, the shaft 67 can be swung clockwise or counter-clockwise for a scanning operation.

In order to transmit continuous motion to the two gears 74 and 77, a motor 81 is provided having a shaft 82 driving a pinion 83 in mesh with the gear 77 and also in mesh with a gear 84 attached to a counter-shaft 85 having a second gear 86 thereon in mesh with the driven gear 74.

For selectively energizing the solenoids 72 and 73, two contactors 87 and 88 are arranged to ride upon the respective contactor rings 75 and 76 for energizing the solenoid 72, and likewise two contactors 90 and 91 ride upon the respective contactor rings 78 and 80. These two sets of contactors are in a circuit shown in Fig. 13, and are selectively controlled by a bridge contactor in the form of a rock segment 92 slidably carried by a fixed segment 93 mounted upon posts 94 for concentrically partially encircling the shaft 67. At the opposite ends respectively of the segment 93 are spring contacts 95 and 96 arranged to be alternately engaged by the bridge contactor 92 at the limit of its motion in both directions. Oscillating motion is transmitted to the bridge contactor 92 by two pins 97 and 98 attached to the bridge contactor 92 and inwardly directed to be in the path of a pick-up arm 100 keyed for movement with the shaft 67. The pins 97 and 98 are circumferentially spaced to be picked up by the arm 100 near the respective ends of the oscillation of the scanning operation. When the arm 100 engages the pin 97 the bridge contactor 92 is moved to engage the contact 96 to energize one solenoid, and when the arm 100 engages the pin 98 the bridge contactor 92 is moved to energize the other solenoid. Thus, the arc of swing of the scanning drum is automatically determined by the arcuate position of the pins 97 and 98 as limit controls.

For controlling the deflection voltage for the horizontal scan angle indication, the movable arm of potentiometer 64 is mounted on the shaft 67 to oscillate therewith thereby to alter the horizontal deflection synchronously with the scanning operation. Since it is undesirable to apply incoming signals to the vertical deflection plates of the tube 63 during the return sweep of the scanning drum, a switch 101 is located in the path of a finger 102 attached to the shaft 67 and is timed to engage and close the switch 101 at the beginning of the scanning operation and hold it closed until the return sweep of the scanning drum begins, at which time the finger 102 is removed and the switch remains open thereby to open the circuit of the vertical deflection plates.

I claim as my invention:

1. A heat detecting system, comprising a scanning device for locating a source of energy, means for causing said device to sweep through a predetermined angle, a unit responsive to said energy located by said scanning device for generating a plurality of electrical pulses in a timed sequence as a function of the sweep of said scanning device with respect to said energy, means for superposing said pulses to form an output greater than any one of said pulses, and means responsive to the superposed pulses for indicating the presence of said composite pulse.

2. A heat detecting system in accordance with claim 1 characterized in that the indicating means is operated by a sweep of the scanning device in one direction only.

3. A heat detecting system, comprising a scanning device for locating a source of heat, means for causing said device to scan a selected area, a unit responsive to heat waves located by said scanning device for generating a plurality of electrical pulses in a timed sequence as a function of the sweep of said scanning device, means for superposing said pulses to form an output greater than any one of said pulses, means responsive to the superposed pulses for indicating the presence of said composite pulse, and means rendering said indicating means inoperative upon a return sweep of said scanning device.

4. A heat detecting system, comprising a scanning device for locating a source of heat, means for causing said device to scan a selected area, a unit responsive to heat waves located by said scanning device for generating a plurality of electrical pulses in a timed sequence as a function of the sweep of said scanning device, means for superposing said pulses to form an output greater than any one of said pulses, and means including an electron ray tube rendering said indicating means inoperative upon a return sweep of said scanning device.

5. A heat detecting system, comprising a scanning device for locating a source of heat, means for causing said device to scan a selected area, a unit including a plurality of heat responsive elements for generating a plurality of electrical pulses, said elements being arranged for successive operation in a timed sequence as a function of the sweep of said scanning device, means for superposing said pulses to form an output stronger than any one of said superposed pulses for indicating the presence of said composite pulse.

6. A heat detecting system, comprising a plurality of heat responsive elements arranged in spaced relation, a heat reflecting member for focusing received heat waves upon said elements, means to move said member to sweep a horizontal angle and energize said elements one at a time when said member detects a source of heat, an electrical circuit responsive to said energized elements to generate a succession of pulses out of time phase as a function of the rate of sweep of said member, an output circuit arranged to receive said pulses, a time delay network for bringing said pulses into phase in said output circuit, and means actuated by the combined pulse output for indicating the composite of the plurality of pulses.

7. A heat detecting system, comprising a plurality of heat responsive elements arranged in spaced relation, a heat reflecting member for focusing received heat waves upon said elements, means to move said member to sweep a horizontal angle and energize said elements one at a time when said member detects a source of heat, an electrical circuit responsive to said energized elements to generate a succession of pulses out of time phase as a function of the rate of sweep of said member, an output circuit arranged to receive said pulses, means to deliver the last of a series of pulses directly to said output, means to delay each pulse prior to said last pulse by the time interval necessary to bring said prior pulses into phase with said last pulse at said output, and means actuated by the combined pulse output for indicating the composite of the plurality of pulses.

8. A heat detecting system, comprising a plurality of heat responsive elements arranged in spaced relation, a heat reflecting member for focusing received heat waves upon said elements, means to move said member to sweep a horizontal angle and energize said elements one at a time when said member detects a source of heat, an electrical circuit responsive to said energized elements to generate a succession of pulses out of time phase as a function of the rate of sweep of said member, an output circuit arranged to receive said pulses, a time delay network for bringing said pulses into phase in said output circuit, a cathode ray tube having vertical deflecting plates and horizontal deflecting plates, said vertical deflecting plates being included in the circuit of said output, means including a potentiometer for controlling said horizontal deflecting plates, and means for operating said potentiometer in synchronism with said sweep member.

9. A heat detecting system, comprising a plurality of heat responsive elements arranged in spaced relation, a heat reflecting member for focusing received heat waves upon said elements, means to move said member to sweep a horizontal angle and energize said elements one at a time when said member detects a source of heat, an electrical circuit responsive to said energized elements to generate a succession of pulses out of time phase as a function of the rate of sweep of said member, an output circuit arranged to receive said pulses, a time delay network for bringing said pulses into phase in said output circuit, a cathode ray tube having vertical deflecting plates and horizontal deflecting plates, said vertical deflecting plates being included in the circuit of said output, means including a potentiometer for controlling said horizontal deflecting plates, means for operating said potentiometer in synchronism with said sweep member, and means to open the circuit of said deflecting plates on the return of said sweep member.

10. A heat detecting system comprising a scanning drum, a heat reflecting member mounted in said drum and adapted to focus received heat waves within said drum, a plurality of heat responsive elements arranged in spaced relation at said focus, means including two solenoids for oscillating said drum, means for alternately energizing said solenoids, means actuated by said elements for generating a plurality of electrical pulses in a timed sequence as a function of the sweep of said scanning drum, means for superposing said pulses each on the other and means for indicating said pulses as a composite pulse.

JOHN EVANS.

REFERENCES CITED

The following references are of record in the file of this patent:

UNITED STATES PATENTS

| Number | Name | Date |
|---|---|---|
| 2,237,193 | Mobsky | Apr. 1, 1941 |
| 2,284,345 | Schlesman | May 26, 1942 |
| 2,369,622 | Toulon | Feb. 13, 1945 |
| 2,392,873 | Zahl | Jan. 15, 1946 |
| 2,410,233 | Percival | Oct. 29, 1946 |